United States Patent
Bernet et al.

(10) Patent No.: US 8,335,034 B2
(45) Date of Patent: Dec. 18, 2012

(54) OPTICAL DEVICE WITH A PAIR OF DIFFRACTIVE OPTICAL ELEMENTS

(75) Inventors: Stefan Bernet, Innsbruck (AT); Monika Ritsch-Marte, Innsbruck (AT)

(73) Assignee: Medizinische Universitat Innsbruck, Innsbruck (AT)

( * ) Notice: Subject to any disclaimer, the term of this patent is extended or adjusted under 35 U.S.C. 154(b) by 183 days.

(21) Appl. No.: 12/452,711

(22) PCT Filed: Jul. 20, 2007

(86) PCT No.: PCT/EP2007/006490
§ 371 (c)(1),
(2), (4) Date: Jan. 19, 2010

(87) PCT Pub. No.: WO2009/012789
PCT Pub. Date: Jan. 29, 2009

(65) Prior Publication Data
US 2010/0134869 A1 Jun. 3, 2010

(51) Int. Cl.
*G02B 26/00* (2006.01)
*G02F 1/00* (2006.01)
(52) U.S. Cl. .................. 359/290; 359/237
(58) Field of Classification Search .......... 359/237, 359/290–292, 295, 298
See application file for complete search history.

(56) References Cited

U.S. PATENT DOCUMENTS

| | | | | |
|---|---|---|---|---|
| 5,680,253 A | | 10/1997 | Hasegawa et al. | 359/566 |
| 5,880,846 A | * | 3/1999 | Hasman et al. | 356/602 |
| 6,154,278 A | * | 11/2000 | Ito et al. | 356/499 |
| 6,442,312 B1 | * | 8/2002 | Terao et al. | 385/37 |
| 7,671,986 B2 | * | 3/2010 | Yao | 356/326 |
| 2003/0179804 A1 | | 9/2003 | Cook | 372/100 |
| 2006/0028961 A1 | | 2/2006 | Kim | 369/112.01 |

OTHER PUBLICATIONS

Kolodziejcyk et al, Diffractive Elements of Variable Optical Power and High Diffraction Efficiency, Applied optics, OSA, Optical Society of America, Wshington, D.C, US, vol. 32, No. 23, pp. 4317-4322, Aug. 10, 1993.
Lohmann, A New Class of Varifocal Lens, Applied Optics, vol. 9, No. 7, pp. 1669-1691, Jul. 1970.
Bara et al., Determination of Basic Grids for Substractive Moire patterns, Applied Optics, vol. 30, No. 10, pp. 1258-1262, Apr. 1, 1991.
ZzzzzBurch et al., Varifocal Moire Zone Plates for Straightness Measurement, Applied Optics, vol. 16, No. 9, pp. 2445-2450, Sep. 1977.
Jaroszewicz et al., Equilateral Hyperbolic Moire Zone Plates with Variable Focus Obtained by Rotations, Optic Express 918, vol. 13, No. 3, 8 pages, Feb. 7, 2005.

* cited by examiner

*Primary Examiner* — Thomas K Pham
*Assistant Examiner* — Brandi Thomas
(74) *Attorney, Agent, or Firm* — Ohlandt, Greeley, Ruggiero & Perle, LLP; George W. Rauchfuss, Jr.

(57) ABSTRACT

The present invention provides an optical device comprising a pair of specifically designed plate-like diffractive optical elements successively arranged in parallel to each other. Placing the two diffractive optical elements in succession and in parallel to each other in a certain distance, the combination optically corresponds to a single diffractive optical element, and it can perform similar tasks, acting as a lens, an axicon, a phase shifter, or a spiral phase plate. If one of the diffractive optical elements is rotated with respect to the other around a common central axis, the property of the optical device, like the focal length, the refractive power, helical index, or phase shift changes continuously.

13 Claims, 8 Drawing Sheets

Spiral phase plate with variable helical index

First phase plate

Second phase plate

OPTICAL DEVICE WITH A PAIR OF DIFFRACTIVE OPTICAL ELEMENTS

The present invention relates to an optical device comprising a pair of diffractive optical elements, the optical device acting as a specific optical element having a continuously changeable optical property.

Diffractive optical elements (hereinafter also abbreviated as DOEs) generally are available in the form of optically transparent, flat plates made of glass, plastic etc., that have an imprinted, specially designed phase pattern with a microscopically fine phase modulation. DOEs for particular tasks are commercially available, acting for example as line or pattern generators, hologram projectors, laser beam profile converters, lenses, arrays of lenses, axicons (i.e., ring-like prisms), and others. For example, diffractive lenses (Fresnel lenses) are commercially used in combination with normal refractive lenses in high quality camera optics. One advantage of a DOE-lens is that it is very thin and lightweight, consisting of thin glass plates, or even only of a structured coating on top of a normal glass lens. Furthermore, if properly designed the dispersive properties of DOEs can compensate such of normal refractive glass optics, thus allowing to construct dispersion-free optical systems without chromatic errors.

A. W. Lohmann, "A new class of varifocal lenses," Appl. Opt. 9, 1669-1671 (1970) discloses a diffractive zoom lens system based on a lateral shift of two diffractive elements. In A. Kolodziejczyk and Z. Jaroszewicz, "Diffractive elements of variable optical power and high diffraction efficiency," Appl. Opt. 32, 4317-4322 (1993), the generation of diffractive elements of variable optical power based on the mutual displacement of diffractive structures with encoded purely phase wave fronts is presented. The mutual displacement may be a translation, a rotation or a change of the scale of one of the diffractive structure with respect to the other one. A superposition of mutually rotated kinoforms of phase gratings is described that generate conjugate wave fronts with linear phases, the rotation of the kinoforms by a certain angle in opposite directions resulting in a diffractive counterpart of a Risley-Herschel prism of variable power.

It is an object of the present invention to provide an optical device acting as a specific optical element having a continuously variable property, the device having a compact size and a high efficiency. The optical device further should provide for an improved accuracy of the optical element in the whole range of variation of the respective optical property.

These objects are achieved with the features of the claims.

The present invention is based on the general idea to successively arrange a pair of specifically designed diffractive optical elements (DOEs). The DOEs usually are circular plates having a diameter of about 50 mm or less, and may be as small as 1 mm. Placing the two DOEs in succession and in parallel to each other in a certain distance, preferably 10 µm or less, the combination optically corresponds to a single DOE, and it can perform similar tasks, acting for example as a lens with a certain focal length. If one of the DOEs is rotated with respect to the other around a common central axis, a specific property of the optical device, like the focal length of a diffractive lens, changes continuously in a predesigned and advantageous way.

The present invention particularly describes the design of a pair of DOEs acting as a diffractive lens, a so-called Fresnel lens, with a focal length that is continuously variable in a broad range by a mutual rotation of the two DOEs. Such a lens can be used in the same way as a refractive glass lens, for example for imaging (cameras, telescopes, microscopes), or for beam projection purposes (as, e.g., in beamers, overhead projectors, laser scanners), but with the additional advantage that its focal length is variable. In imaging applications, this allows to construct systems that act like a human eye, i.e. they can focus by variation of the lens refractive power, instead of using bulky zoom-optics that works by axial shifting the lens positions. The device of the present invention further provides a compact design in the lateral direction.

Similarly, the pair of DOEs may designed to act as a diffractive axicon, i.e. a spherical analog of a prism, that generates a ring of light by refraction, with a refraction power that is variable by a mutual rotation of the DOE pair. Axicons are important optical elements in many scientific applications for beam shaping purposes, for example for specialized microscope illumination systems (STED), in atom trapping, optical tweezers, in fiber coupling optics, and others.

Furthermore, a DOE pair according to the present invention can act as a pure phase shifter, where the phase shift is very precisely adjustable by the mutual rotation angle of the two DOEs. Such a device can be also used as a very accurate frequency shifter of a light beam if a continuous rotation of one of the DOEs with respect to the other is introduced. Such very precise phase and frequency shifters have numerous applications, for example in optical interferometers that are used for quantitative measurements of object transformations on a wavelength scale.

Another embodiment of the present invention is the design of a DOE pair that acts as a so-called spiral phase plate with an adjustable helical index, transforming an incident light beam into a so-called doughnut mode beam with a variable helical charge. Such spiral phase plates are important elements in scientific applications, since they create light beams that carry angular momentum that can be transferred at microscopic particles, as for example in atom trapping or in optical tweezers. More recently, such spiral phase plates have also become the essential components of a new method in optical phase contrast microscopy.

Due to the mutual rotation of the DOEs, a section of the combined DOE may be formed having an optical property different from that of the remaining area of the combined DOE, for example a different focal length in case the optical device acts as a lens. In order to avoid this effect, the optical device of the present invention may further comprise a sector-shaped absorber covering the sector having the undesired optical property. Formation of such a sector having an undesired optical property may also be avoided by eliminating a discontinuity in the phase profiles of the diffractive optical elements that appears along a radial line extending from the center to the edge. This can be done during the calculation of the DOE by rounding the argument of the transmission function describing the phase profiles. Furthermore, an embodiment of the present invention provides for an efficient reduction of undesired light emitted by the optical device, if the efficiency of the individual DOEs is below 100%, which can be, for example, the consequence of limitations in the production process.

In all of the applications the DOEs are preferably designed such that their combination yields so-called blazed phase grating structures, for example sawtooth-like gratings, that have an overall diffraction efficiency of almost 100%. Preferably, the two DOEs of the optical device of the present invention are, at a certain rotation angle, mirror images of each other, i.e. one needs only two copies of the same master element that are arranged behind each other in a face-to-face configuration, the "face" being the side of the DOE on which the phase profile is imprinted. Thus, the optical phase transfer function of one of the DOEs is geometrically mirrored with regard to the other one. That is, two identical elements can be used with the respective sides on which the phase profiles are imprinted facing each other which reduces production costs.

The present invention is described in the following in further detail with reference to the figures which show.

PRINCIPLES OF DIFFRACTIVE OPTICAL ELEMENTS (DOES)

DOEs are commercially available optical elements consisting of microscopic phase structures in a transparent material. They can act as lenses, arrays of lenses, or as holograms (so-called kinoforms) that can be designed to project certain patterns (lines, crosses, dot arrays etc.) by illumination with a plane light wave. Each pixel of a DOE shifts the phase of an incident light beam in an interval between 0 and $2\pi$. Therefore, if such a DOE is illuminated with an incident plane wave, the output wave behind the DOE plate carries a predesigned wavefront modulation. The corresponding DOEs are calculated with well-known algorithms (e.g. Kinoform algorithm, Gerchberg-Saxton algorithm etc.) such that they perform the desired tasks. The output of the algorithms corresponds to the so-called transmission function $T(x,y)$ of the desired DOE and is in this case a "phase-only-landscape" of the form $T(x,y)=\exp(i\Phi(x,y))$, where $\Phi(x,y)$ is an array of pixels in a range between 0 and $2\pi$, corresponding to the phase shift a light beam acquires when passing through the corresponding spot.

In the next processing step, the calculated phase landscapes are imprinted into a material with techniques like photolithography, electron beam lithography, or mechanical micromachining ("diamond-turning"), such that each spot of the material delays the phase of an incoming light beam by the desired phase value. This can be either achieved with a modulated surface profile (that is for example etched into a quartz plate), or by a spatially modulated index of refraction in a material with a flat surface, as for example in photopolymer films. The typical size of each pixel is in a range between 0.1 and 3 microns, and the typical diameter of a DOE on the order of 2-10 mm.

An important difference of computer generated DOEs as compared to "normal" holograms (which are recorded by superposition of an object and a reference wave) is that the calculated DOE phase structures are typically non-sinusoidal, i.e. the structures of $\Phi(x,y)$ look locally like sawtooth-gratings. Due to this feature the diffraction efficiency of DOEs can reach 100% of the incident light if they are properly designed, in contrast to phase holograms that yield (due to their symmetric grating structures) only a maximal diffraction efficiency of 40%.

Figure 1:
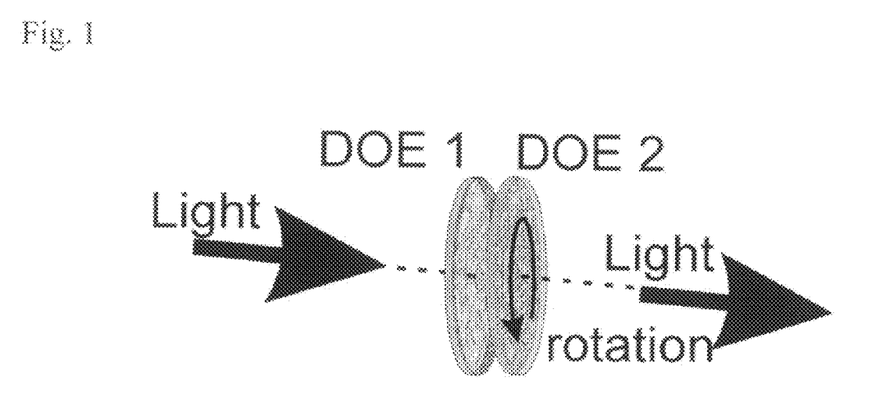
FIG. 1 the principle setup of the optical device according to the present invention.

FIG. 1 shows the principle setup of an optical device according to the present invention. Two DOEs are placed at a small mutual distance behind each other. They can be mutually rotated around a central axis that is perpendicular to their surfaces. The DOE combination manipulates the wavefront of an incident light wave in a predesigned way, that depends on the mutual rotation angle.

If two DOEs with transmission functions $T_1(x,y)=\exp(i\Phi_1(x,y))$ and $T_2(x,y)=\exp(i\Phi_2(x,y))$ are placed directly behind each other within a sufficiently small distance, generally as small as on the order of some light wavelengths, then the combination of the two adjacent DOEs corresponds optically to one single DOE with a transmission function of $$T_{combi}(x,y)=T_1(x,y)T_2(x,y), \quad \text{Eq. (1)}$$

i.e. the phase landscape of the combined DOE is $$\Phi_{combi}(x,y)=\Phi_1(x,y)+\Phi_2(x,y). \quad \text{Eq. (2)}$$

Thus, the combination of two DOEs can yield a transmission function for various specific purposes, that can furthermore be continuously changed if the two DOEs are mutually rotated. The underlying principle is to some extent related to the Moiré effect, which is discussed, e.g., in S. Bara, Z. Jaroszewicz, A. Kolodziejczyk, and V. Moreno, "Determination of basic grids for subtractive moire patterns," Appl. Opt. 30, 1258-1262 (1991), J. M. Burch and D. C. Williams, "Varifocal moiré zone plates for straightness measurement," Appl. Opt. 16, 2445-2450 (1977), or Z. Jaroszewicz, A. Kolodziejczyk, A. Mira, R. Henao, and S. Bará, "Equilateral hyperbolic moiré zone plates with variable focus obtained by rotations," Opt. Express 13, 918-925 (2005). In the Moiré effect, a combination of two microscopically fine grating structures of similar grating constants yields a macroscopically modulated grating structure. However, typically the Moiré effect is generated with absorptive instead of phase structures, and it typically does not create "blazed" phase grating structures within the combined transmission function, such that the overall efficiency of Moiré structures is limited to a few percent.

Varifocal Fresnel Lens

A set of two specially designed successive DOEs can act as a highly (almost 100%) efficient Fresnel zone plate (i.e. a lens) with a focal length that can be continuously changed in a broad (selectable) range by a mutual rotation. Such an optical lens element with variable focal length can substitute heavy and space consuming zoom optics made of glass lenses in imaging systems like cameras, microscope eye-pieces, telescopes, and in beam controlling applications, like fiber-couplers, optical bar-code scanners, or optical manipulators.

The corresponding transmission functions of the two DOEs are calculated according to:

$$T_{lens1}(x,y)=\exp[iar(x,y)^2\theta(x,y)] \text{ and } T_{lens2}(x,y)=\exp[-iar(x,y)^2\theta(x,y)]. \quad \text{Eq. (3)}$$

Figure 2:
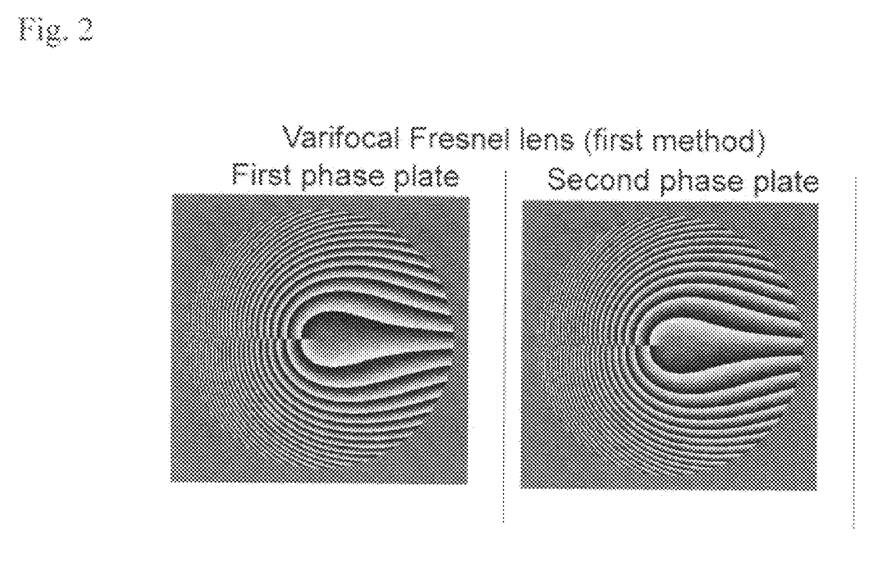
FIG. 2 the phase pattern of two DOEs that act after combination as a Fresnel lens with a refractive power that depends on their mutual rotation angle.

There x and y are the cartesian coordinates of a point (x,y) with the origin x=0, y=0 corresponding to the center of the plate, and $r(x,y)=(x^2+y^2)^{1/2}$ and $\theta(x,y)=\text{angle}(x+iy)$ are the corresponding polar coordinates of the same point. As will be shown below, the constant a is proportional to the optical power of the combined DOE system. In order to create two DOEs from these transmission functions, only the phase of them has to be calculated at each point, and the result has to be taken modulo ($2\pi$) such that the result consists of an array of phase values in a range between 0 and $2\pi$. The corresponding phase patterns of the two DOEs are plotted in 0.

In FIG. 2, and in all further DOE plots described below, grey values between white and dark correspond to phase values in a range between 0 and $2\pi$. The two transmission functions $T_{lens1}$ and $T_{lens2}$ are complex conjugates. Symmetry considerations and the pictures of the DOEs in FIG. 2 show, that the two DOEs are mirror images of each other (if they are both rotated by 90 degrees). Therefore two identical DOEs with the same transmission function $T_{lens1}$ can be used. If they are positioned face-to-face the second of the two DOEs is flipped upside down, and this corresponds actually to the desired mirrored function $T_{lens2}$. If the second DOE (with transmission function $T_{lens2}$) is rotated by a certain angle $\phi$ that can be adjusted in a range between $-2\pi$ and $2\pi$, then the total transmission function of the combined DOE becomes:

$$T_{combi}=\exp(iar^2\theta)\exp(-iar^2(\theta-\phi))=\exp(ia\phi r^2). \quad \text{Eq. (4)}$$

Note that such a transmission function $T_{combi}$ corresponds exactly to that of an ideal lens with a refractive power of $$f^{-1}=a\phi\lambda/\pi$$

(in diopters, corresponding to the inverse of the focal length f), where $\lambda$ is the light wavelength. Therefore, the change of the optical power depends linearly on the mutual rotation angle between the two DOEs, i.e. $df^{-1}/d\phi=a\lambda/\pi$.

The corresponding phase transmission function of the combined DOE system corresponds to that of the kinoform of an ideal lens that has—due to its asymmetric, sawtooth-like phase grating structure (due to the modulo $2\pi$ operation) an unlimited diffraction efficiency, i.e. such a DOE element can be used for the designed light wavelength exactly like a "normal" glass lens without generating any undesired light contributions.

Figure 3:
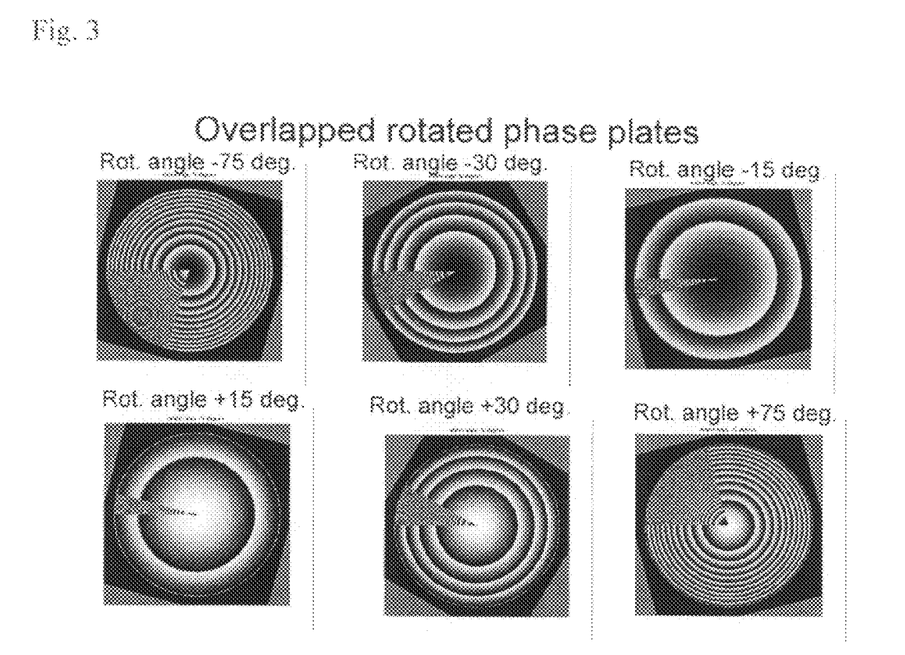
FIG. 3 the resulting phase pattern of a superposition of the two DOEs of FIG. 2 at different mutual rotation angles.

The corresponding phase patterns created by the combined DOE system are plotted in FIG. 3 for some positive and negative rotation angles $\phi$, namely −75, −30, −15 degrees in the upper row and +15, +30, +70 degrees in the lower row. Again, the phase values are plotted as gray-values that correspond actually to phases in a range between 0 and $2\pi$.

FIG. 3 shows that rotations of the second DOE yield Fresnel lenses with positive or negative refractive power, depending on the rotational direction (positive and negative refractive powers can be distinguished in the plots by the direction of the radial phase change).

Interestingly, as can be seen from FIG. 3, in addition to the desired Fresnel lens, a sector of the combined DOEs appears that shows a Fresnel lens pattern with another focal length. This sector consists of the area between the radial lines of the two DOEs that emerge from their centers in the polar angle direction of $\pi$. The reason of the appearance of these sectors is the periodicity of the phase definition in Eq. (5), i.e. an angular rotation of $\phi$ of one of the DOEs with respect to the other is indistinguishable from another rotation by an angle of $\phi\pm2\pi$ (the sign has to be chosen such that $|\phi\pm2\pi|<2\pi$). The two cases yield according to Eq. (5) two Fresnel lenses with different refractive powers of $f_1^{-1}=a\phi\lambda/\pi$, and $f_2^{-1}=-a(\phi\pm2\pi)\lambda/\pi$, respectively. Since the rotation angle $\phi$ is only modulated in a range between $-2\pi$ and $2\pi$, the corresponding two focal lengths $f_1$ and $f_2$ have always a different sign, and also a different absolute value, with the exception of the case $\phi=\pi$, that yields a combined DOE consisting of two symmetric half-spheres, where the two halves act as a convex and a concave Fresnel lenses, respectively, with equal absolute values of their refractive powers.

This effect that may be disturbing in applications like imaging, but it can be reduced if the mutual rotational angle is limited to an interval that is considerably smaller than the complete $2\pi$-range. Furthermore the "wrong" sector of the lens can be covered by a sector-shaped absorber in front of the DOE. However, since the refractive powers of the two sectors are very different, and have also different signs, the DOE pair may also be used in many practical applications without masking.

Varifocal Fresnel Lens with Avoided Sector Formation

The present invention further provides a way to avoid such a sector formation. It can be shown that the appearance of the undesired sector is due to the fact, that the formula for creation of the two DOEs according to Eq. (3) ($T_{1,2}=\exp[\pm iar^2\theta]$) is not continuous at the transition from $\theta=\pi$ to $\theta=-\pi$, i.e. at the radial line from the center to the left edge of each of the DOEs (see FIG. 2). However, this non-continuous line in the DOEs can be avoided, if the formula for the DOE generation is slightly changed, according to:

$$T_{lens1}=\exp[i\text{round}\{ar^2\}\theta] \text{ and } T_{lens2}=\exp[-i\text{round}\{ar^2\}\theta] \quad \text{Eq.(6)}$$

where the round{ . . . }-operation means rounding of the argument to the next higher integer number.

Figure 4:
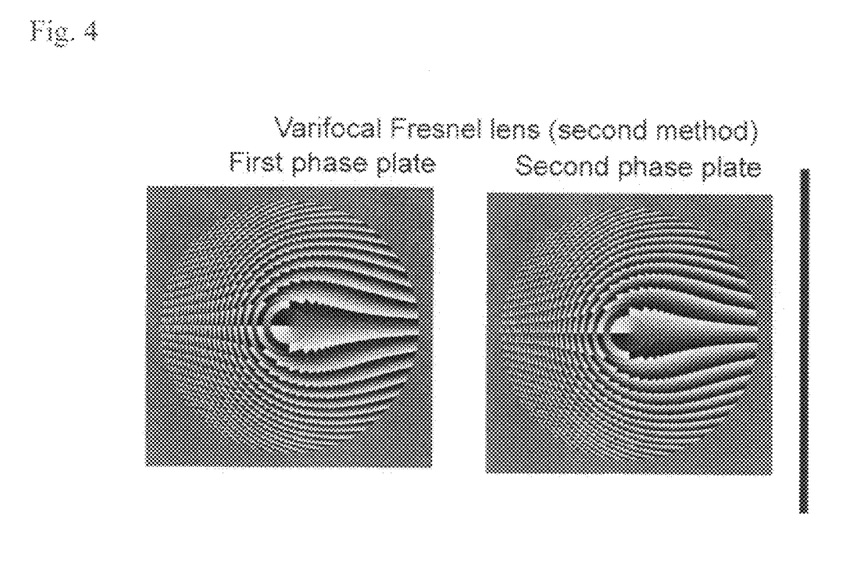
FIG. 4 the phase pattern of two DOEs that form after combination Fresnel lenses with a refractive power that depends on the mutual rotation angle similar to those in FIG. 2, modified such that they do not generate the sectoring effect.

An example for the corresponding phase patterns of the two DOEs is plotted in FIG. 4. The phase pattern looks similar to that of the first method shown in FIG. 2, however the phase edges appear now "rougher". On the other hand, the discontinuity at the $\theta=\pi$ radial line has now disappeared. The two DOEs have still the property that they have a mirror symmetry, i.e. they are identical phase structures if one of them is flipped upside down and placed "face-to-face" on top of the other one.

Figure 5:
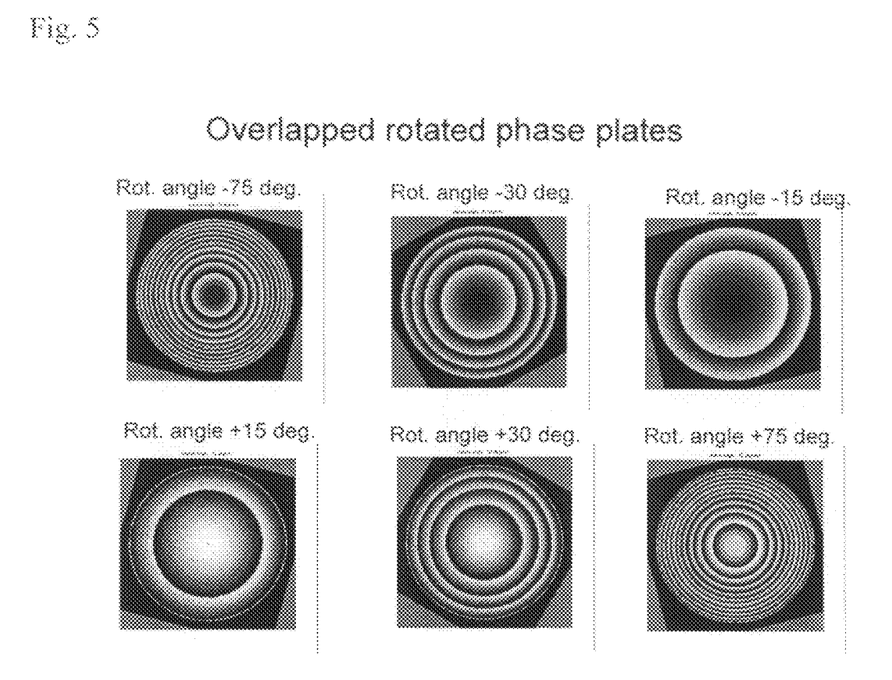
FIG. 5 the resulting phase pattern of a superposition of the two DOEs of FIG. 4 at different mutual rotation angles.

The corresponding phase values of the combined DOE system are again plotted in FIG. 5 for some positive and negative rotation angles $\phi$, namely −75, −30, −15 degrees in the upper row and +15, +30, +70 degrees in the lower row.

As can be seen, there is no sector formation any more. The transition from negative to positive refractive powers when changing the mutual rotation angle $\phi$ from positive to negative is completely smooth, forming an almost "perfect" blazed Fresnel lens for small mutual rotation angles (as e.g. shown in the range degrees to $\phi=-30$ degrees to $\phi=+30$ degrees in FIG. 5). However, for larger mutual rotation angles (e.g. $\phi=75$ degrees) the combined Fresnel lens becomes slightly less efficient, i.e. the corresponding sawtooth-grating becomes more and more binarized instead of staying smooth.

The reason for this behaviour is, similar to the case described above, the latent ambiguity of the rotation angle between an angular rotation of $\phi$ and one of $\phi \pm 2\pi$. These two cases form in fact two superposed Fresnel lenses with refractive powers of $f_1^{-1}=a\phi\lambda/\pi$, and $f_2^{-1}=-a(\phi \pm 2\pi$, respectively (the sign is chosen such that $|\phi \pm 2\pi|<2\pi$). The relative contribution of the two lenses varies as a function of the mutual rotation angle, i.e. for small angles $\phi$ there is a major contribution of $f_1$, whereas for angles larger than 180 degrees (or smaller than −180 degrees) $f_2$ dominates. Thus the diffraction behavior of the combined DOE is similar to that of a binary Fresnel lens that acts as a superposition of a convex and a concave lens, but with the difference that both, the diffraction efficiencies and the refractive powers of the two superposed lenses are not equal.

Figure 6:
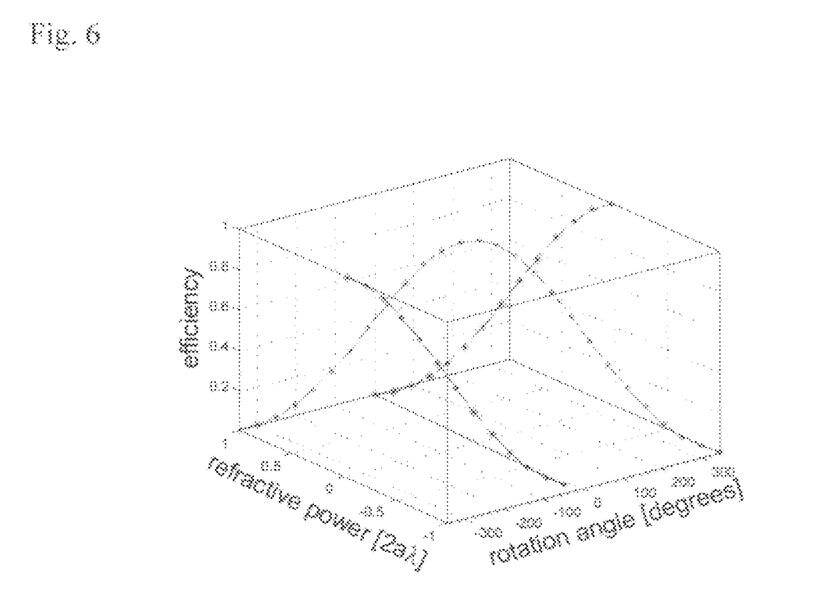
FIG. 6 a plot of the diffraction efficiency and the refractive power of a Fresnel lens with avoided sectioning, as a function of the mutual rotation angle between the two DOEs.

FIG. 6 shows a calculation of the diffraction efficiencies for the two superposed lenses as a function of the mutual rotation angle in a range between −360 to 360 degrees. The curve having the $\cos^2$-shape connecting the left and right lower corners of the box corresponds to the diffraction efficiency of the desired Fresnel lens. It has its largest efficiency at a mutual rotation angle of zero, corresponding to a refractive power of 0, and its falls off only smoothly (by less than 15%) in an intervall between −90 and +90 degrees. On the other hand, the efficiency of the second superposed Fresnel lens within this intervall is less than 15%. Furthermore, the refractive power of this undesired lens is very different from the first one, i.e. it is close to the maximal value of $f_2^{-1}=\pm 2a\lambda$. Interestingly, at a mutual rotation angle of zero the refractive power of the second lens jumps from $f_2^{-1}=+2a\lambda$, to $f_2^{-1}=-2a\lambda$. However, at the jump position the efficiency of the corresponding lens vanishes such that this jump has no real effect in the experiment.

The graph in FIG. 6 thus shows, that a mutual rotation of the two DOEs by an angle between −90 degrees and +90 degrees is possible, with only a low loss of 15% in the efficiency of the combined Fresnel lens.

If one of the two DOEs is continuously rotated with constant speed with respect to the other, the corresponding Fresnel lens is periodically scanning in an adjustable range of focal lengths. This may have applications in imaging systems (inspection cameras) and beam scanning systems (bar-code readers etc.). For example, a periodically rotating DOE lens which is combined with an imaging system that uses a shutter that is phase locked to the DOE rotation (i.e. the shutter opens always at a certain angular position of the DOE) sharply focuses at objects in a certain distance that depends on the relative phase between the shutter openings and the DOE rotation. If the shutter acts electronically (e.g. a gateable image intensifier) focusing can be controlled purely by electronical means, by just varying the phase between DOE rotation and shutter openings.

In practice, the maximally available focal range in which the Fresnel lens by the combination of the two DOEs can be changed is given by Eq. (5), i.e. $f^{-1}=a\phi\lambda/\pi$, where $\phi$ can vary in a range between $-2\pi$ and $2\pi$. There is however a limitation on the maximal value of the constant a that is imposed by the resolution of the physical DOE. In order to resolve a grating that is printed as a pixel array, the maximal phase shift between two adjacent pixels has to be smaller than $\pi$, i.e.:

$$\frac{d\Phi}{dr} < \frac{\pi}{p} \text{ and } \frac{d\Phi}{rd\varphi} < \frac{\pi}{p}, \qquad \text{Eq. (7)}$$

where p is the minimal size of one DOE pixel that is typically limited by the refraction process. The first and second conditions hold for the radial and tangential phase resolution, respectively. For DOEs generating Fresnel lenses it turns out that the first condition is always more restrictive than the second one, thus in the following it can be considered alone.

Since the DOEs that create Fresnel lenses have the transmission functions $T_{1,2}=\exp[\pm iar^2\theta]$, one gets $\Phi=ar^2\theta$. Together with Eq. (7) this yields the condition:

$$2ar_{max}\theta_{max} \leq p^{-1}, \qquad \text{Eq. (8)}$$

where $r_{max}$ is the maximal radius of the DOE, and $\theta_{max}$ is the maximal polar angle. Since $\theta$ is limited to a range between $-\pi$ and $\pi$, $\theta_{max}$ corresponds to $\pi$, and the condition becomes:

$$a<(2pr_{max})^{-1}, \text{ i.e. } a_{max}(2pr_{max})^{-1}. \qquad \text{Eq. (9)}$$

Thus the maximal a-value, $a_{max}$, for a certain DOE depends on both, its pixel resolution and its maximal desired radius. According to Eq. (5), the refractive power of the combined DOE lens with such an $a_{max}$ value is: $f^{-1}=a_{max}\phi\lambda/\pi$. In the last section it was shown that for getting an efficiency on the order of 85% or better, the rotational range of $\phi$ should be limited to an interval between $-\pi/2$ and $+\pi/2$. Thus, inserting $\phi=\pi/2$ altogether one gets the limitation:

$$-f_{min}^{-1} < f^{-1} < +f_{min}^{-1}, \qquad \text{Eq. (10)}$$

where $$f_{min}=4pr_{max}/\lambda. \qquad \text{Eq. (11)}$$

is the smallest achievable focal length of the combined DOE system that is achieved at a mutual rotational angle of ±90 degrees, and that yields a diffraction efficiency of >85%.

As a practical example, a DOE with a typical pixel size of p=1 μm and a diameter of $2r_{max}$=5 mm would have a refractive power adjustable in a range between −50 to +50 diopters, (corresponding to a focal length range between ±2 cm and ±∞) at a wavelength of 500 nm. It can be shown that this limit of the usable range is only by a factor 2 more restricted, than the limit for a single-DOE-Fresnel lens under the same conditions, i.e. in the above example, a single DOE could have a minimal focal length of 1 cm.

In many cases it is not desired to change the refractive power of a lens symmetrically around zero power, but instead around a certain offset value. This might be achieved by placing the combined DOE element directly behind a "normal" glass lens, that acts as an "offset" for the refractive power. However, it can be also achieved by producing such an offset directly at the combined DOE element.

This may be done by multiplying both of the transmission functions of the two DOEs with an offset lens term, each supplied with half of the required offset refractive power $f^{-1}_{offs}$, i.e.:

$$T_{lens1}=\exp[i\text{round}\{ar^2\}\theta]\exp(i\pi r^2/2\lambda f_{offs}) \text{ and}$$

$$T_{lens2}=\exp[i\text{round}\{ar^2\}\theta]\exp(i\pi r^2/2\lambda f_{offs}). \qquad \text{Eq (12)}$$

Figure 7:
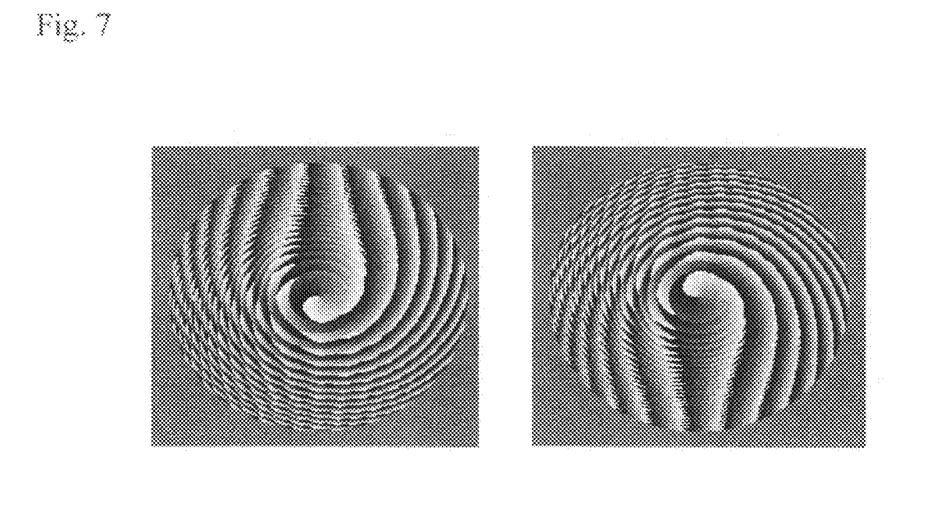
FIG. 7 the phase pattern of two DOEs that produce a combined DOE acting as a varifocal Fresnel lens with an offset of its refractive power.

It can be shown that the combined DOE then changes its focal length as a function of the mutual rotation angle as before, particularly with equal efficiency and equal change of refractive power as a function of the mutual rotation angle, however it has now an offset focal length corresponding to $f_{offs}$. Advantageously, the two elements are still mirror images of each other (at a certain relative rotation) and thus it is sufficient to produce two identical elements with transmission function $T_{lens1}$, that are arranged face-to-face. An example of two DOEs that form after combination a varifocal Fresnel lens with an offset refractive power is shown in FIG. 7.

Axicons with Variable Refractive Power

Similar to an adjustable Fresnel lens, another set of two specially designed DOEs can act as an axicon (or an axicon lens) with a refraction power that is adjustable by the mutual rotation angle. Such axicons are required mainly in beam controlling applications for fiber couplers, optical tweezers and laser cutting systems for achieving an axially extended region of a small focus (so-called "Kessel beams").

The formula for calculating the transmission functions of the two DOEs is:

$$T_{axi1}(x,y)=\exp[iar(x,y)\theta(x,y)] \text{ and } T_{axi2}(x,y)=\exp[-iar(x,y)\theta(x,y)]. \quad \text{Eq. (13)}$$

Figure 8:
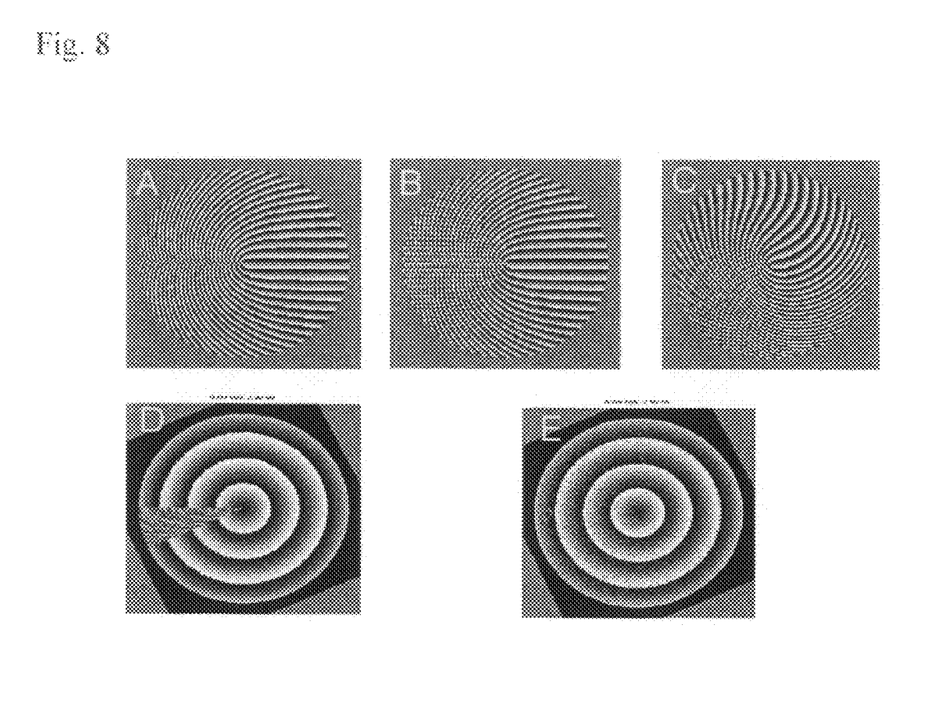
FIG. 8 the phase pattern of two DOEs that act after combination as an axicon with a refractive power that depends on the mutual rotation angle.

An example of a DOE corresponding to such a transmission function is plotted in FIG. 8(A). Similar to the last section, the refractive power of the axicon formed by the combination of these two DOEs is proportional to the constant a, and to the mutual rotation angle $\phi$. All DOEs shown in FIG. 8(A), (B), and (C) have to be combined with a second DOE that is identical to the first one, but flipped upside down.

An example for the combined DOE after a mutual rotation of $T_{axi1}$ and $T_{axi2}$ by an angle of 25 degrees is shown in FIG. 8(D). There is again the effect that an undesired sector forms, that has an angular extension corresponding to the mutual rotation angle, and that contains an axicon lens with a different refractive power. Similar to the last section, the formation of such a sector can be avoided by including a rounding operation into its formula, i.e.:

$$T_{axi1}=\exp[i\text{round}\{ar\}\theta] \text{ and } T_{axi2}=\exp[-i\text{round}\{ar\}\theta], \quad \text{Eq. (14)}$$

An example is plotted in FIG. 8(E), again for a mutual rotation angle of 25 degrees. Similar to the last section, there appears a second axicon structure that is superposed to the first one and that has a different refractive power. However, the relative efficiency of the second axicon structure is again below 15% as long as the mutual rotation angle is limited to the intervall between −90 and +90 degrees.

Finally, it might be desired to produce an "axicon lens", i.e. an axicon with a variable refractive power that is superposed by a "normal" focussing or diverging Fresnel lens of a fixed focal power $f^{-1}_{offs}$. The corresponding formula for getting such an element is $$T_{axi1}=\exp[i \text{ round}\{ar\}\theta]\exp(in r^2/2\lambda f_{offs}) \text{ and}$$

$$T_{axi2}=\exp[i \text{ round}\{ar\}\theta]\exp(in r^2/2\lambda f_{offs}, \quad \text{Eq.(15)}$$

and an example for a corresponding DOE is plotted in Error! Reference source not found.(C).

Such a structure can, for example, produce a ring-shaped light intensity distribution from an incoming plane light wave, that focuses at a certain distance behind the element. Furthermore such a structure has the advantage that the desired axicon-shaped light field has another divergence than residual light that is not diffracted. Such residual light corresponds to the zero diffraction order of the combined DOE element and may appear, if the DOE is not perfectly produced, e.g. if the calculated phase values are not perfectly reconstructed in the physical DOE structure. Due to the different divergences of the desired axicon-like diffracted light, and the undesired zero-order non-diffracted (i.e. transmitted) light, the two components can be easily separated, as e.g. with an aperture stop in a focal plane of the non-diffracted light.

Continuously Adjustable Phase- and Frequency Shifter

Two successive, specially designed DOEs can act as a precise, continuously adjustable phase shifter when they are mutually rotated. Such a phase shifting capability is required for example in optical interferometry, interference microscopy, holography, as well as in many scientific applications (like continuous phase shifting of standing light waves in atom trapping etc.). The DOE system can also act as a continuous frequency shifter of a transmitted light beam, if one of the DOEs is continuously rotated with respect to the other. Such a frequency shifter is required in interferometric ("heterodyning interferometry") and scientific applications.

Figure 9:
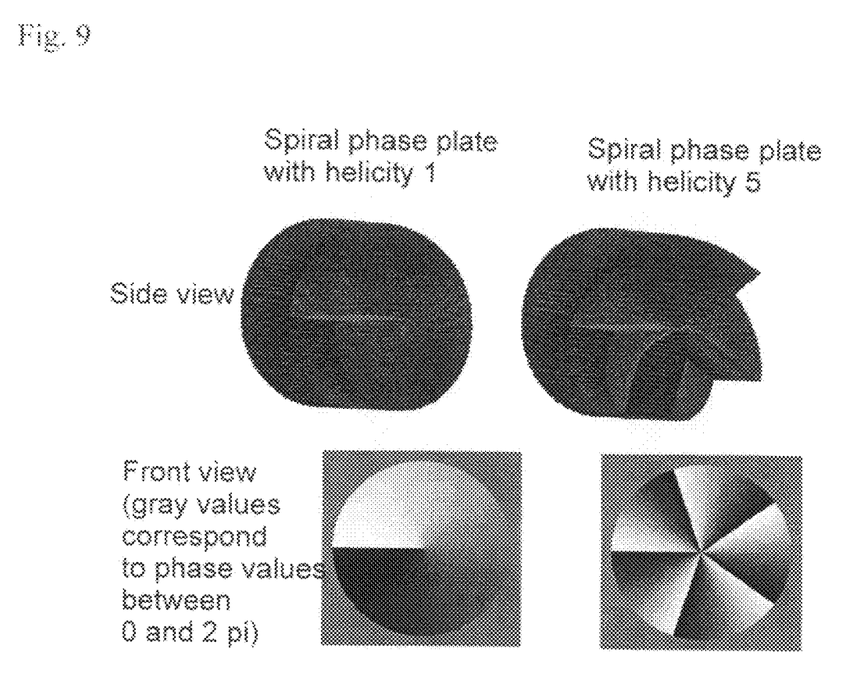
FIG. 9 a side view and a top-view of a spiral phase element with helical index m=1 and m=5, respectively.

For this purpose the corresponding DOEs consist of so-called spiral phase plates, defined by the transmission functions:

$$T_{phas1}=\exp(im\theta) \text{ and } T_{phas2}=\exp(-im\theta), \quad \text{Eq. (16)}$$

where the so-called helical index (sometimes also denoted as "helical charge") m is an integer number. An example for such spiral phase plates is plotted in FIG. 9 for helical indices of m=1, and m=5.

Figure 10:
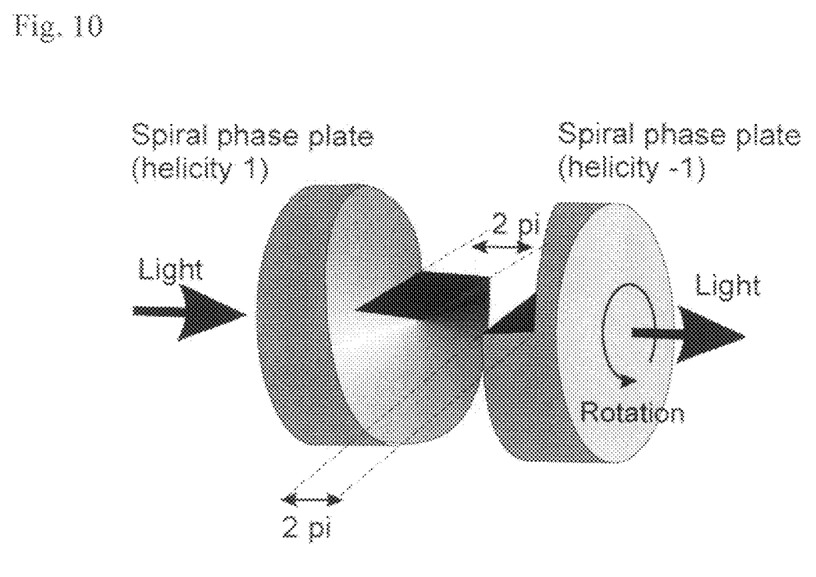
FIG. 10 two identical spiral phase plates with helical index m=1 that are placed face-to-face closely behind each other.

If two identical spiral phase plates are placed face-to-face closely behind each other, their effective helical indices have opposite signs, and the combined DOE acts as a variable phase shifter. An example for such a combined DOE for the case m=1 is shown in FIG. 10. As shown in FIG. 10, two identical spiral phase plates with helical index m=1 are placed face-to-face closely behind each other. Due to the upside-down flipping of one of the DOEs with respect to the other, the effective helicities of the two DOEs in this arrangement have an opposite sign. If one of the DOEs is rotated with respect to the other, the phase of a transmitted light wave is continuously shifted in an intervall between 0 and $2\pi$.

If one of the DOEs is rotated with respect to the other by an angle $\phi$, the combined transmission function becomes:

$$T_{combi}=\exp(-im\theta)\exp(im(\theta-\phi))=\exp(-im\phi) \quad \text{Eq. (17)}$$

Thus, the combined transmission function corresponds to a static, plane phase shift of $m\phi$ that is imprinted on an incoming wave that passes the combined DOE element.

If one of the two elements is continuously rotated with a constant angular frequency $\omega_{rot}$, then the static rotation angle $\phi$ in Eq. (17) has to be substituted by $\omega_{rot}t$, and the system acts as a frequency shifter, changing the light frequency of an incoming optical beam, $\omega_{in}$, into:

$$\omega_{out}=\omega_{in}-m\omega_{rot} \quad \text{Eq. (18)}$$

The sign of the frequency (or phase) shift can be chosen by the rotational direction. Eq. (17) and Eq. (18) also show that the helical index m acts as an intrinsic "gear-transmission" factor, i.e. the phase- or frequency shift of a transmitted beam corresponds to the factor m that is multiplied by the rotation angle or by the rotation frequency of the rotating DOE, respectively.

Combined DOEs with Increased Relative Efficiency

If a DOE pair like the phase shifter of the last chapter is properly produced, both of the two DOEs in a pair, and the combined DOE element have an efficiency of q=100%, i.e. there is no fraction of the incoming wave front that is not shaped in the desired way. If—however—due to practical limitations in the physical DOE element, the actual phase shift of each pixel does not exactly correspond to the scheduled values, then the diffraction efficiency of the two individual DOEs, and that of the combined DOE will decrease. The main undesired contribution of wrongly manipulated light at each of the two DOEs will be the so-called zero diffraction order, i.e. a fraction of light that is just transmitted through the DOE without being influenced. Even if this zero order contribution is small, it can have a considerable effect at the total transmitted wave, since it coherently interferes with the remaining light, which will usually result in a spatial intensity modulation of the transmitted light wave that changes when the DOEs are mutually rotated.

For the case of a "normal" pair of DOEs, where each DOE has an efficiency of q<1 (the efficiency is defined as the fraction $I_{mod}$ of the incident light $I_{in}$ that is modulated in the corresponding way, i.e. $q=I_{mod}/I_{in}$), the total efficiency of the combined DOE is $q^2$, and correspondingly the undesired light wave $I_{noise}$ consists of all the remaining light, i.e. it has an efficiency of $1-q^2$. Thus the "signal-to-noise" ratio of the normal DOE pair is given by:

$$S_{normal}=I_{mod}/I_{noise}=q^2/(1-q^2) \qquad \text{Eq. (19)}$$

However, by sacrificing the property of a DOE-pair to consist of two mirror-symmetric elements, there is a method to considerably increase the performance of the DOE pair. The idea is to separate the undesired zero-order contribution from the desired manipulated light wave by introducing different beam divergences into the two wave components. For example, in this case the correctly manipulated beam will be transmitted through the combined DOE element without changing its divergence, whereas the undesired contribution is strongly divergent, thus being "diluted" at some distance behind the DOE.

This can be achieved, by superposing one of the two DOEs with a strongly diverging lens term, whereas the other DOE is superposed with a strongly converging lens that exactly compensates the effect of the first one. Thus the scheduled light wave does not change its overall divergence after having passed through the two DOEs, whereas zero-order beam components that are only diffracted at one of the two DOEs will become divergent. The only disturbing beam component that keeps the same divergence as the desired wave is the one that passes through both of the DOEs as a zero-order (i.e. a non-diffracted) wave. However, the probability for this effect decreases quadratically as a function of the DOE efficiency, as compared to a just linear decrease if the DOEs are produced without the lens terms. The principle of the method is sketched in FIG. 11.

Figure 11:
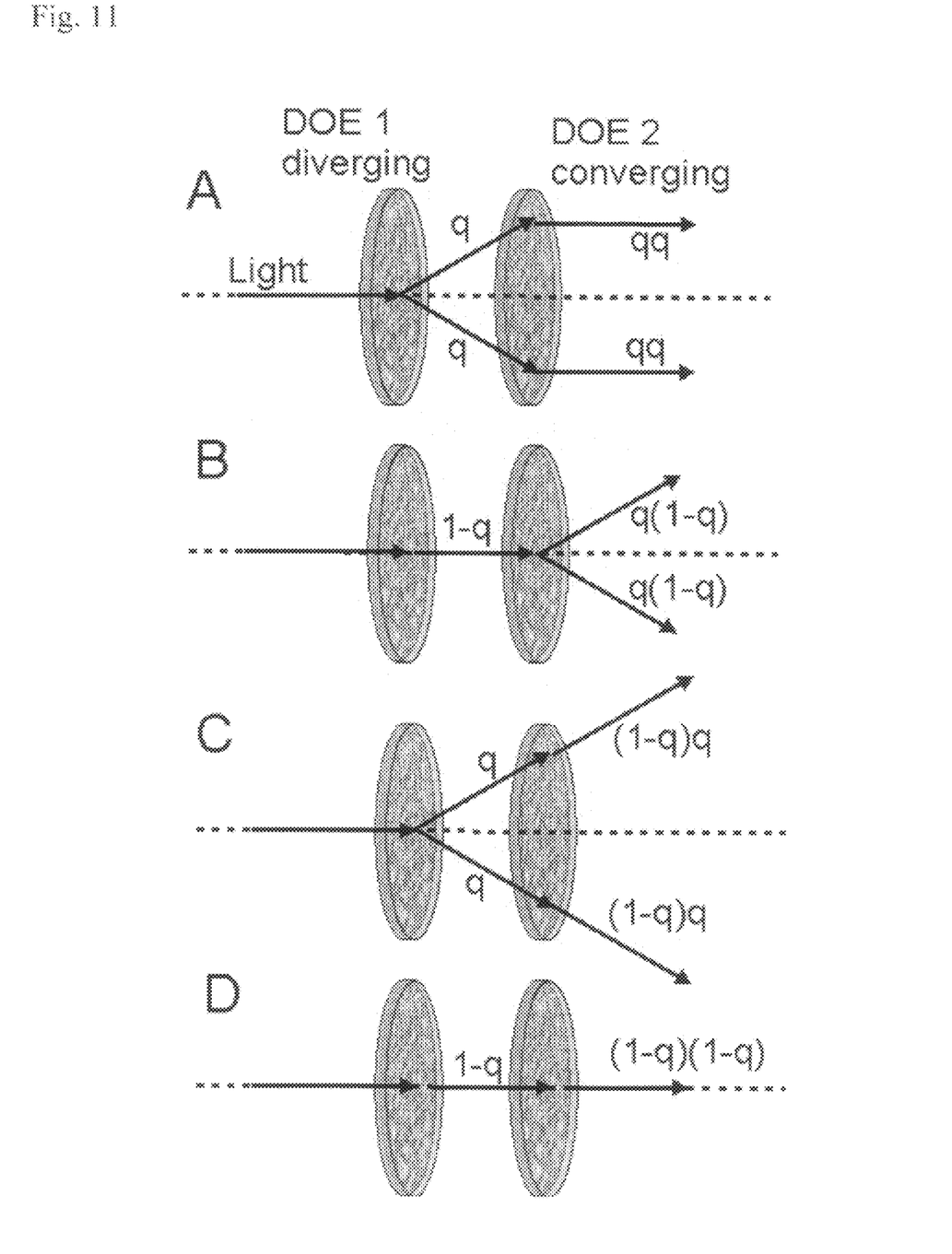
FIG. 11 an illustration of the principle of DOE signal-to-noise optimization according to an embodiment of the present invention.

FIG. 11 is not to scale, since the actual distance between the two DOEs is as close as possible, such that there is no actual beam expansion. The Figure shows a set of two DOEs, where the first one has a superposed diverging lens term (in addition to its tailored phase profile), whereas the second one has a superposed converging lens term of the same absolute refractive power. Part (A) of the figure shows the ideal case, where the light wave is diffracted to the desired first diffraction order by both of the DOEs. As a result, the outcoming wave has the same divergence as the incoming wave, and it has additionally the desired imprinted phasefront modulation. Assuming a diffraction efficiency of q at each of the individual DOES, the total diffraction efficiency is $q^2$.

The next two sketches (B) and (C) in FIG. 11 show the situations with the second highest probabilities, where diffraction happens only at one of the two DOEs, whereas the respective other DOEs are just transmitted by the wave. In both of the situations the outcoming wave is divergent, and thus can be easily separated from the desired signal wave in (A).

The last sketch (D) in FIG. 11 shows the origin of the only contribution of undesired light that has the same divergence as the signal wave and acts therefore as the "noise". It consists of a fraction of the incident wave that is transmitted through both of the DOEs without being diffracted. The corresponding efficiency for this situation is $(1-q)^2$. Thus, one gets an overall "signal-to-noise" $S_{optimal}$ of the optimized DOE pair as:

$$S_{optimal}=q^2/(1-q)^2. \qquad \text{Eq. (20)}$$

Thus the increase in signal-to-noise ratio between the optimized and the normal (Eq. (19)) DOE pair is:

$$S_{optimal}/S_{normal}=(1-q^2)/(1-q)^2. \qquad \text{Eq. (21)}$$

As an example of the increased performance of such a convergent/divergent DOE pair, the case where each single DOE has a diffraction efficiency of 90% (q=0.9), whereas 10% of the incident light are transmitted without diffraction in the zero-order is discussed. Diffraction into other diffraction orders can be neglected for blazed DOE structures.

In this case, the "signal-to-noise" ratio of a normal DOE pair (according to Eq. (19)) would be $S_{normal}$=4.3. On the other hand, the corresponding signal-to-noise ratio of the optimized DOE pair would be (Eq. (20)) $S_{optimal}$=81, corresponding to an almost 20-fold increase. If this method is applied for the continuous phase- and frequency shifter described in the previous section, the corresponding transmission functions of the two DOEs becomes:

$$T_{phas1}=\exp(im\theta)\exp(i\pi r^2/\lambda f_{div}) \text{ and } T_{phas2}=\exp(-im\theta)\exp(-i\pi r^2/\lambda f_{div}). \qquad \text{Eq. (22)}$$

There, $f_{div}$ is the focal length of the superposed converging and diverging Fresnel lenses, and is preferably chosen as small as practically possible (limited by Eq. (11)) in order to achieve a fast "dilution" of the undesired beam components by divergence behind the DOE pair.

Figure 12:
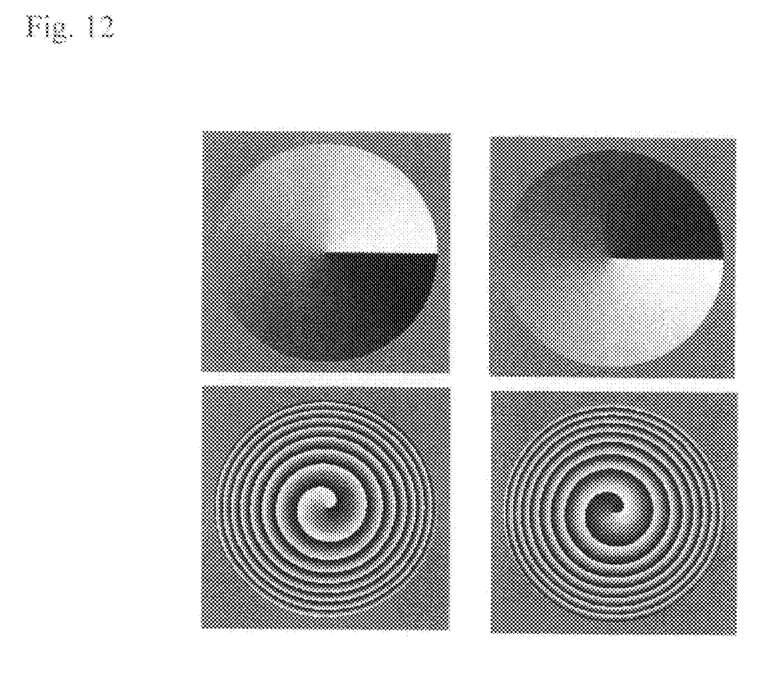
FIG. 12 showing phase patterns of spiral phase elements with helical indices of m=1 and m=−1 (upper row), and the same phase functions superposed with a focusing and a defocusing lens term (lower row).

The combined DOE element has the same transmission $T_{combi}=\exp(-im\phi)$ as a function of the mutual rotation angle $\phi$ than the "normal" DOE pair described by Eq. (16). The corresponding DOE elements of the "normal" DOE pair and the optimized pair are compared in FIG. 12 showing phase patterns of spiral phase elements with helical indices of m=1 and m=−1 (upper row), and the same phase functions superposed with a focusing and a defocusing lens term (lower row). A phase/frequency shifter produced by the DOE pair in the lower row has a significantly increased relative efficiency between the desired phase-shifted wave component, and residual non-diffracted components.

DOE-Pairs for Spiral Phase Elements with a Variable Helical Index

Spiral phase elements have important applications in beam shaping for generating so-called doughnut beams, which are used for optical trapping (laser tweezers and atom traps), for transferring angular momentum to microscopic particles (optical pumps), and more recently for spiral phase contrast imaging in microscopy and interferometry.

A set of two successive DOEs, that can act as a spiral phase element with a helical charge that can be continuously adjusted (and even inverted) in a selected range by adjusting the mutual rotation angle of the two DOEs is designed.

The basic transmission functions of the corresponding DOEs are given by:

$$T_{spir1}=\exp(ia\theta^2) \text{ and } T_{spir2}=\exp(-ia\theta^2), \qquad \text{Eq. (23)}$$

where a is a constant that determines the change in the helical index of the combined DOE as a function of the rotation angle. Thus the transmission function of the combined DOE at a mutual rotation angle of $\phi$ becomes:

$$T_{combi}=\exp(ia\theta^2)\exp(-ia[\theta-\phi]^2)=\exp(2ia\phi\theta)\exp(-ia\phi^2). \qquad \text{Eq. (24)}$$

This corresponds to the transmission function of a spiral phase plate with a helical index of m=2a$\phi$ (first factor), combined with an additional pure phase shifter by an amount of $-a\phi^2$ (second factor). If such a combined DOE is not used for interferometric purposes, but just as a mode converter, the phase shifting term can be neglected, and the helical index of the combined spiral phase element depends linearly on the mutual rotation angle $\phi$.

Figure 13:
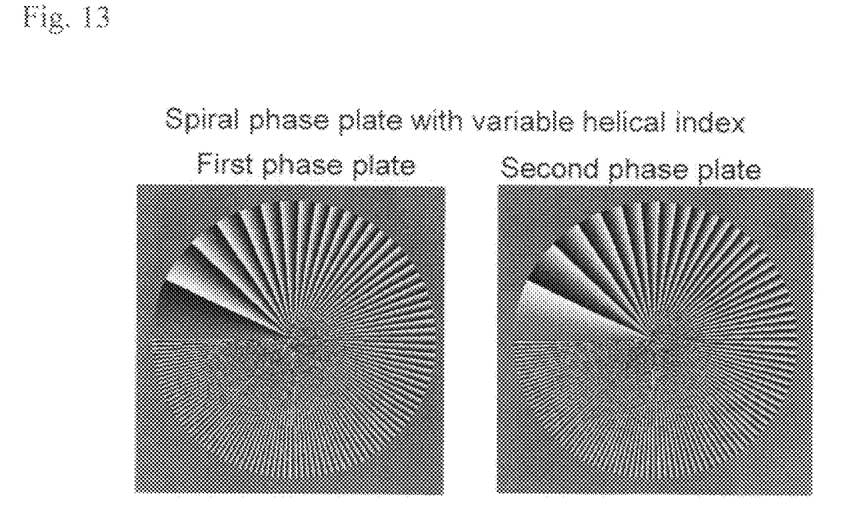
FIG. 13 the phase pattern of two DOEs that act after combination as a spiral phase element with a variable helical index that depends linearly on the mutual rotation angle between the two DOEs.

An example for a set of DOEs with the transmission functions according to Eq. (24) is shown in FIG. 13.

Figure 14:
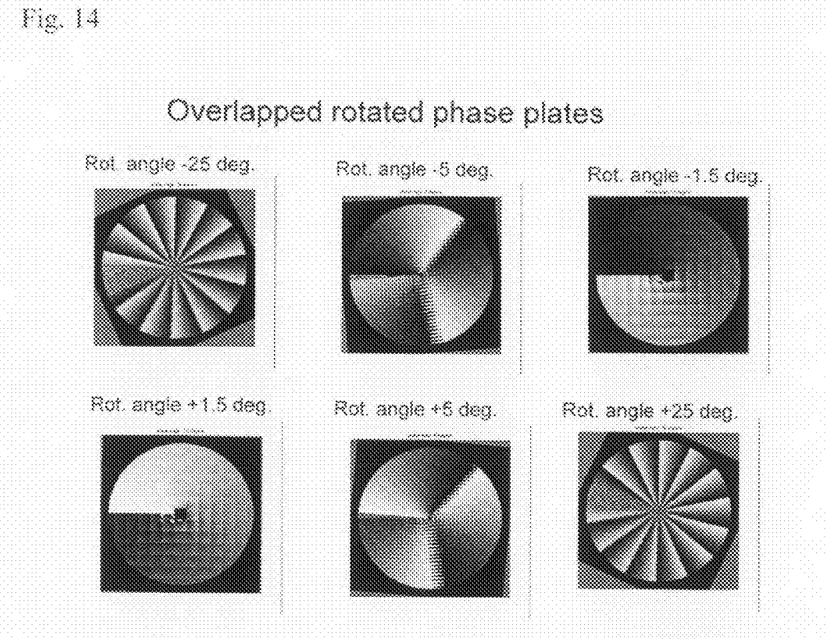
FIG. 14 the resulting phase pattern of a superposition of the two DOEs of FIG. 13 at different mutual rotation angles.

The resolution requirements are most stringent in the region around the center of the DOEs. The resulting combined transmission function after an overlapping of the two DOEs are shown in FIG. 14 for a number of mutual rotation angles, namely −25, −5, −1.5, +1.5, +5, and +25 degrees. The corresponding transmission functions correspond to spiral phase elements with helical indices of approximately −13, −3, −1, +1, +3, and +13, respectively.

There it turns out that again a sector formation appears, similar to the sectoring in FIG. 3. The reason is also the same, i.e. the sectoring is due to the ambiguity of the rotation angle $\phi$ that appears in Eq. (24) for the transmission function of the combined DOE, i.e. a rotation of $\phi$ cannot be distinguished from one of $\phi \pm 2\pi$, and therefore the combined spiral phase element contains two helical indices simultaneously, however, the undesired second index is contained in the sector included by the mutual rotation angle of the two DOEs. Therefore, using a large a-factor in the design of the DOEs still allows to produce DOE elements that generate a considerable change of the helical indices at a rather small mutual rotation angle, such that the area of the undesired sector will be negligible for many practical applications.

In analogy to the DOE optimization method described in the last section, it is also possible to increase the signal-to-noise contrast by superposing a divergent and a convergent lens term (with focal lengths $\pm f_{div}$) at the two DOEs. In this case the two optimized transmission functions become:

$$T_{spir1} = \exp(ia\theta^2)\exp(i\pi r^2/\lambda f_{div}) \text{ and } T_{spir2} = \exp(-ia\theta^2)\exp(-i\pi r^2/\lambda f_{div}), \quad \text{Eq. (25)}$$

Figure 15:
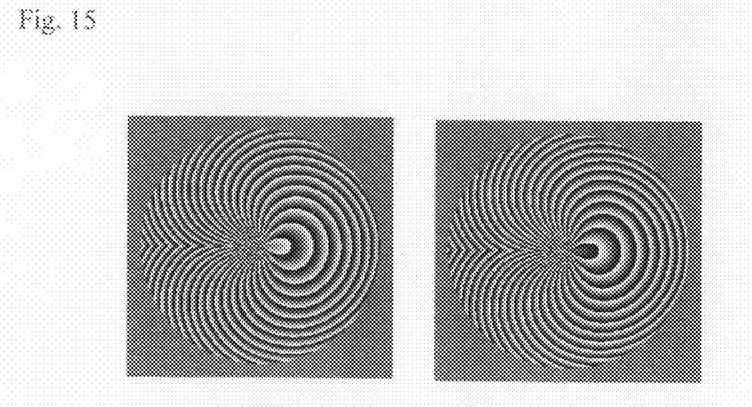
FIG. 15 an optimized pair of DOEs that generates the same spiral phase elements with variable helical indices as that shown in FIG. 13, but with a significantly increased signal-of-noise ration obtained by superposing the first and second DOE with a diverging and converging lens term, respectively.

An example for two DOEs that are calculated according to these transmission functions is shown in FIG. 15.

The transmission function of the combined DOE corresponds exactly to that of the previous pair of DOEs (see FIG. 13), but there is an increase in signal-to-noise ratio if the diffraction efficiency of the individual DOEs is smaller than 1, that is given by Eq. (21).

In the above detailed description, the design of optical elements like continuously adjustable phase shifters, adjustable Fresnel zone plates and axicons, and an adjustable spiral phase element which are all controlled by a mutual rotation of two successive DOEs has been discussed which provides a technical solution for many tasks in optical systems. In the following the technical solutions for the different applications mentioned in the previous sections are listed.

Fresnel Zone Plate as a Lens with Continuously Adjustable Focal Length

Such lenses are highly demanded in technical applications. Just as one example, with such a lens it would be possible to realize imaging systems which focus—similar to a human eye—not by adjusting the distances between optical elements (by axially shifting of lenses), but instead the focal length of the imaging lens. The production of varifocal lenses is still in the research state, i.e. there are approaches to use drops of liquid as lenses, where the drop curvature can be controlled by applying an electric field. Similar approaches use an interface between two liquids which can be curved by an electric field. Finally there are specially designed liquid crystal systems which can act as varifocal lenses. Compared to the present invention, all of these approaches are more complex and elaborate and also do not allow to periodically scan the focal plane (by a continuous rotation of one DOE with respect to the other). In approaches using a pair of two Moiré patterns which can be mutually rotated to realize a varifocal zone plate, the efficiency is limited to 16%, whereas the present invention allows an almost 100% efficiency.

Axicons with Adjustable Refraction Power

The technical approaches to realize axicons with adjustable refraction power (mainly required for beam control applications) are similar to those mentioned in the last paragraph. Again it has been proposed to realize such elements with Moiré patterns, resulting however in a limited efficiency of 16%.

Spiral Phase Element with Variable Helical Charge

Spiral phase elements for generating doughnut beams, or for spatial filtering purposes are usually produced as holograms, or as DOEs. However, in this case the corresponding helical charge is not variable. Spiral phase elements with variable helical charge can be programmed at standard liquid crystal displays with a high resolution, or at customized liquid crystal displays. Both methods are very cost expensive. Also, the generation of a variable spiral phase element by controlled deformation of a special plexiglass disc with mechanical methods has been reported. However, this method requires very sophisticated mechanics and production methods.

Phase- and Frequency Shifters for Interferometers Etc.

For standard phase shifting applications, known solutions are an optical path length shift by piezo-mounted mirrors, the insertion of a pair of complementary glass wedges into the beam path, which are laterally shifted, or the insertion of a glass plate which can be tilted around a horizontal or vertical axis. All these mentioned methods have the disadvantage that phase shifting is not continuous, i.e. the used optical elements have a "stopping position" from where they have to be reset to their respective "starting positions", before the phase shifting can go on. This also prevents to use these methods as adjustable frequency shifters as can be done by a continuous mutual rotation of the DOEs according to the present invention.

A known method to achieve a continuous phase shift is the use of the so-called Pancharatnam phase by a mutual rotation of a combination of two quarterwave and one halfwave plate in a beam path. However, in contrast to the present invention, the Pancharatnam method is only realizable for light in a certain polarization state. A particular advantage of the present invention is its high phase shifting accuracy, and the possibility to realize a "gear transmission", i.e. to generate pairs of DOEs that produce a +/−n f frequency shift (where n is an integer number which depends on the design of the DOEs and can reach 1000) when spatially rotated with f Hz.

The invention claimed is:

1. Optical device comprising a pair of plate-like diffractive optical elements (DOEs) with transmission functions $T_1(r, \theta) = \exp[i\Phi_1(r,\theta)]$ and $T_2(r, \theta) = \exp[i\Phi_2(r,\theta)]$ where r and $\theta$ are polar coordinates, r being the radius and $\theta$ being the polar angle, and $\Phi_{1,2}(r,\theta)$ are phase profiles within 0 and $2\pi$ imprinted on the DOEs, the two DOEs being successively arranged in parallel to each other with a sufficiently small separation between them that the combination of the two adjacent DOEs corresponds optically to one single DOE with a transmission function of $T_{combi} = T_1 * T_2$, one (or both) of the DOEs being adapted to be rotated relative to the other around an axis perpendicular to the surface, so that the pair of DOEs acts as a DOE with the transmission function $$T_{combi} = T_1(r,\theta) * T_2(r,\theta-\phi) = \exp[i\Phi_1(r,\theta)] * \exp[i\Phi_2(r,\theta-\phi)] = \exp[i\{\Phi_1(r,\theta) + \Phi_2(r,\theta-\phi)\}] \text{ where } \phi \text{ is the relative angle of rotation,}$$

wherein the phase profiles $\Phi_{1,2}$ of the two DOEs are given by $$\Phi_1(r,\theta)=\mathrm{mod}_{2\pi}\{[F(r)\theta+m_{phas}\theta+a_{spir}\theta^2]+[G_{offs}(r)/2]+a_{div}r^2\} \text{ and}$$

$$\Phi_2(r,\theta)=\mathrm{mod}_{2\pi}\{-[F(r)\theta+m_{phas}\theta+a_{spir}\theta^2]+[G_{offs}(r)/2]-a_{div}r^2\},$$

where $\mathrm{mod}_{2\pi}\{\ldots\}$ means the modulo $2\pi$ operation, where $m_{phas}$ is an integer number or zero, where the coefficients $a_{spir}$ and $a_{div}$ are real numbers or zero and where $F(r)$ and $G_{offs}(r)$ are real functions depending on r but not on $\theta$, $F(r)$ and $G(r)$ chosen so that each of the corresponding transfer functions $T_F(r)=\exp[iF(r)]$ and $T_G(r)=\exp[iG_{offs}(r)]$ respectively is the transfer function of either a (rotationally symmetrical) Lens or of a (rotationally symmetrical) axicon or of an arbitrary superposition thereof, wherein $G_{offs}(r)$ may also be zero for all values of r and wherein $F(r)$ may also be zero for all values of r, yet under the condition that in this case (i.e. $F(r)=0$) at least one of the coefficients $m_{phas}$ or $a_{spir}$ is not zero.

2. Optical device according to claim 1, wherein the phase profiles $\Phi_{1,2}$ of the two DOEs are given by $$\Phi_1(r,\theta)=\mathrm{mod}_{2\pi}\{[a_{lens}r^2\theta+a_{axic}r\theta+m_{phas}\theta+a_{spir}\theta^2]+(a_{offs}/2)r^2+a_{div}r^2\} \text{ and}$$

$$\Phi_2(r,\theta)=\mathrm{mod}_{2\pi}\{[a_{lens}r^2\theta+a_{axic}r\theta+m_{phas}\theta+a_{spir}\theta^2]+(a_{offs}/2)r^2-a_{div}r^2\},$$

where $\mathrm{mod}_{2\pi}\{\ldots\}$ means the modulo $2\pi$ operation and where the coefficients $a_{lens}$, $a_{axic}$, $a_{spir}$, $a_{offs}$ and $a_{div}$ are real numbers which also may be zero and the coefficient $m_{phas}$ is an integer number or zero, yet where at least one of the coefficients $a_{lens}$, $a_{axic}$, $m_{phas}$ or $a_{spir}$ is not zero.

3. Optical device according to claim 1, wherein the maximum relative rotation of the two DOEs is limited by the extremal rotation angles $\phi_{min}$ and $\phi_{max}$ which fulfill the condition $[-90°\leq\phi_{min}<\phi<\phi_{max}\leq+90]$, where $\phi$ is the relative rotation angle.

4. Optical device according to claim 1, further comprising a sector-shaped light-absorber which at least covers an angular sector of the pair of DOEs, wherein said covered angular has an angular aperture of $\alpha_{cov}=\phi_{max}-\phi_{min}$.

5. Optical device according to claim 1, further comprising a light-absorber with variable geometry, wherein this light-absorber is adapted to cover an angular sector of the pair of DOEs, said covered sector having the angular aperture of $\phi$, where $\phi$ is the actual relative rotation angle.

6. Optical device comprising a pair of plate-like diffractive optical elements (DOEs) with transmission functions $T_1(r,\theta)=\exp[i\Phi_1(r,\theta)]$ and $T_2(r,\theta)=\exp[i\Phi_2(r,\theta)]$ where r and $\theta$ are polar coordinates, r being the radius and $\theta$ being the polar angle, and $\Phi_{1,2}(r,\theta)$ are phase profiles within 0 and $2\pi$ imprinted on the DOEs, the two DOEs being successively arranged in parallel to each other with a sufficiently small separation between them that the combination of the two adjacent DOEs corresponds optically to one single DOE with a transmission function of $T_{combi}=T_1*T_2$, one (or both) of the DOEs being adapted to be rotated relative to the other around an axis perpendicular to the surface, so that the pair of DOEs acts as a DOE with the transmission function $$T_{combi}=T_1(r,\theta)*T_2(r,\theta-\phi)=\exp[i\Phi_1(r,\theta)]*\exp[i\Phi_2(r,\theta-\phi)]==\exp[i\{\Phi_1(r,\theta)+\Phi_2(r,\theta-\phi)\}] \text{ where } \phi \text{ is the relative angle of rotation,}$$

wherein the phase profiles $\Phi_{1,2}$ of the two DOEs are given by $$\phi_1(r,\theta)=\mathrm{mod}_{2\pi}\{[\mathrm{round}\{F(r)\}\theta+m_{phas}\theta]+[G_{offs}(r)/2]+a_{div}r^2\} \text{ and}$$

$$\phi_2(r,\theta)=\mathrm{mod}_{2\pi}\{-[\mathrm{round}\{F(r)\}\theta+m_{phas}\theta]+[G_{offs}(r)/2]-a_{div}r^2\},$$

where $\mathrm{mod}_{2\pi}\{\ldots\}$ means the modulo $2\pi$ operation, where $m_{phas}$ is an integer number or zero, where the coefficient $a_{div}$ is a real number or zero and where $F(r)$ and $G_{offs}(r)$ are real functions depending on r but not on $\theta$, $F(r)$ and $G(r)$ chosen so that each of the corresponding transfer functions $T_F(r)=\exp[iF(r)]$ and $T_G(r)=\exp[iG_{offs}(r)]$ respectively is the transfer function of either a (rotationally symmetrical) Lens or of a (rotationally symmetrical) axicon or of an arbitrary superposition thereof, wherein $G_{offs}(r)$ may also be zero for all values of r and wherein $F(r)$ may also be zero for all values of r, yet under the condition that in this case [i.e. $F(r)=0$] the coefficient $m_{phas}$ is not zero.

7. Optical device according to claim 6, wherein the phase profiles $\Phi_{1,2}$ of the two DOEs are given by $$\phi_1(r,\theta)=\mathrm{mod}_{2\pi}\{[\mathrm{round}\{a_{lens}r^2+a_{axic}r\}\theta+m_{phas}\theta]+(a_{offs}/2)r^2+a_{div}r^2\} \text{ and}$$

$$\phi_2(r,\theta)=\mathrm{mod}_{2\pi}\{-[\mathrm{round}\{a_{lens}r^2+a_{axic}r\}\theta+m_{phas}\theta]+(a_{offs}/2)r^2-a_{div}r^2\},$$

where $\mathrm{mod}_{2\pi}\{\ldots\}$ means the modulo $2\pi$ operation, round $\{\ldots\}$ means rounding of the argument to the next higher integer number and where $a_{lens}$, $a_{axic}$, $a_{offs}$ and $a_{div}$ are freely selectable coefficients which also may be zero and the coefficient $m_{phas}$ is an integer number or zero, yet where at least one of the coefficients $a_{lens}$, $a_{axic}$ or $m_{phas}$ is not zero.

8. Optical device according to claim 1, wherein one of the diffractive optical elements is adapted to continuously rotate with an angular frequency $\omega_{rot}$ for continuously changing those optical properties of the optical device that depend on the rotation angle $\phi$.

9. Optical device according to claim 6, wherein one of the diffractive optical elements is adapted to continuously rotate with an angular frequency $\omega_{rot}$ for continuously changing those optical properties of the optical device that depend on the rotation angle $\phi$.

10. Optical device according to claim 1, wherein the phase profile imprinted on the diffractive optical elements has pixels with a size of 10 μm or less.

11. Optical device according to claim 1, wherein the phase profile imprinted on the diffractive optical elements has pixels with a size on the order of the light wavelength, or larger.

12. Optical device according to claim 6, wherein the phase profile imprinted on the diffractive optical elements has pixels with a size of 10 μm or less.

13. Optical device according to claim 6, wherein the phase profile imprinted on the diffractive optical elements has pixels with a size on the order of the light wavelength, or larger.

* * * * *